United States Patent Office 3,515,843
Patented June 2, 1970

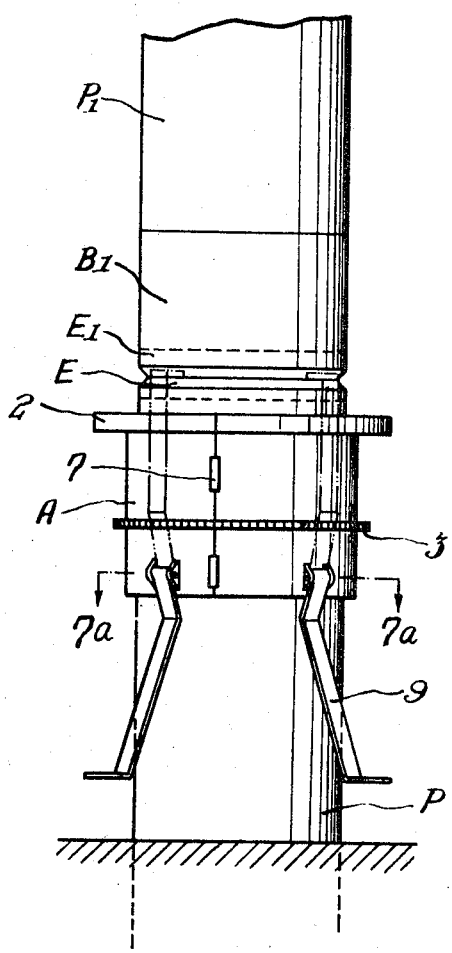
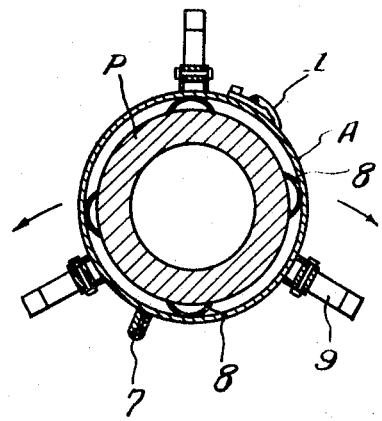

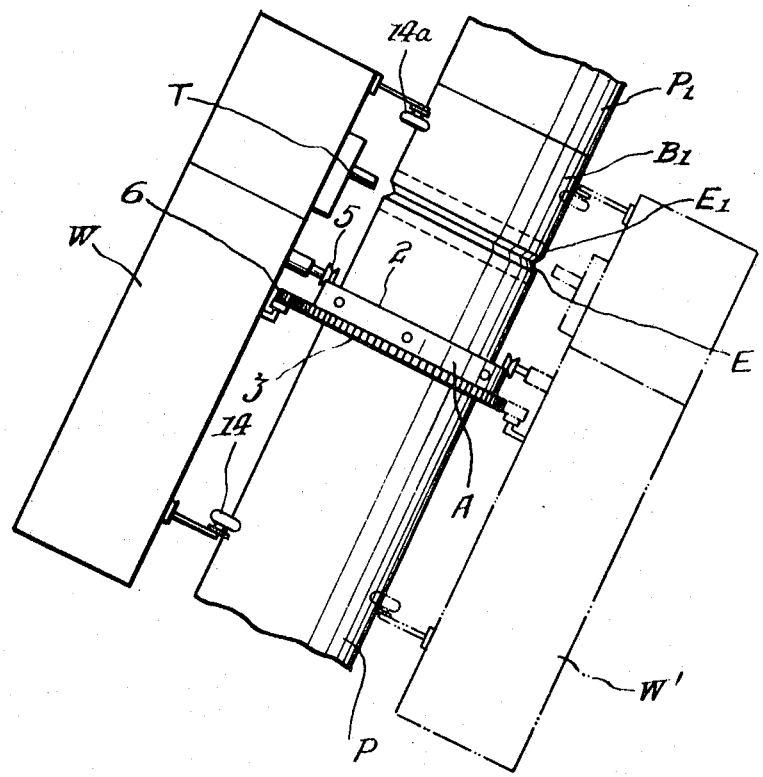

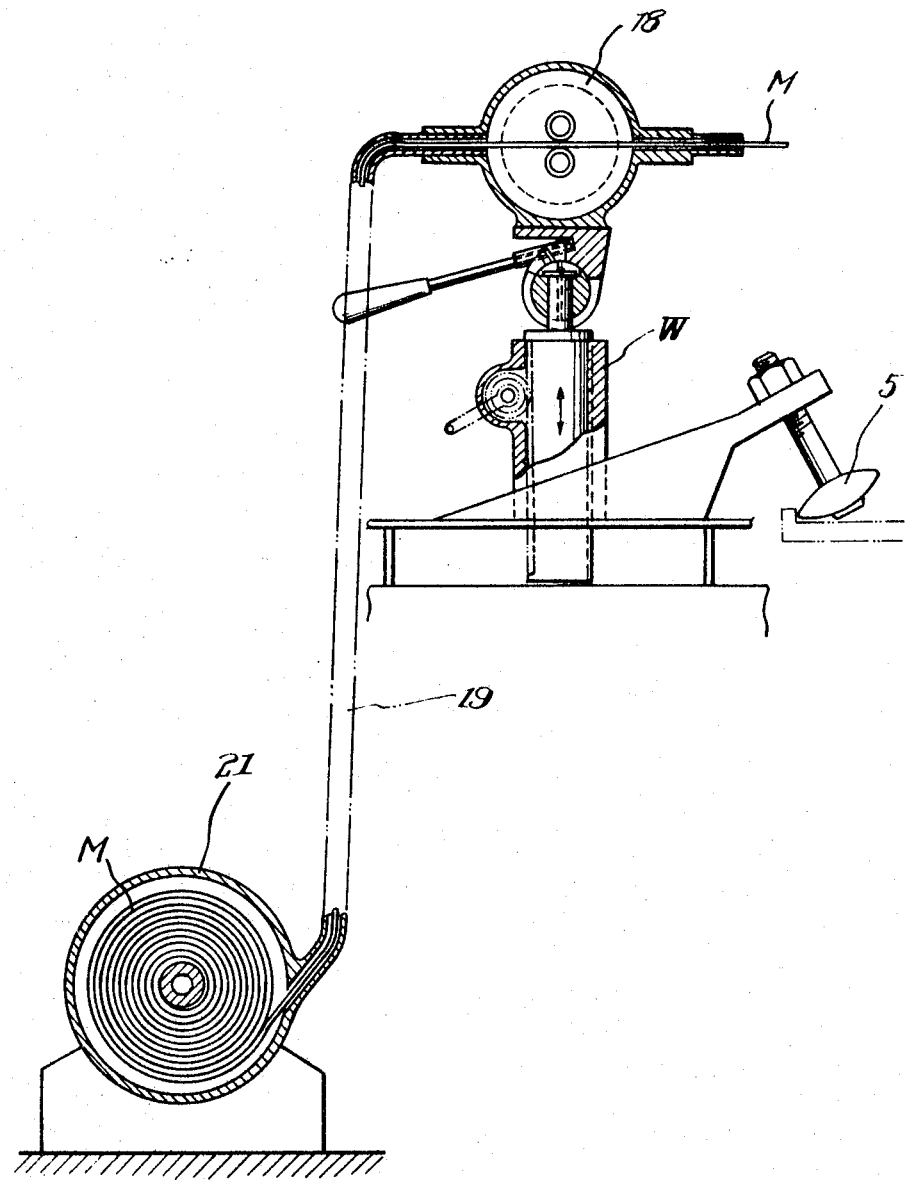

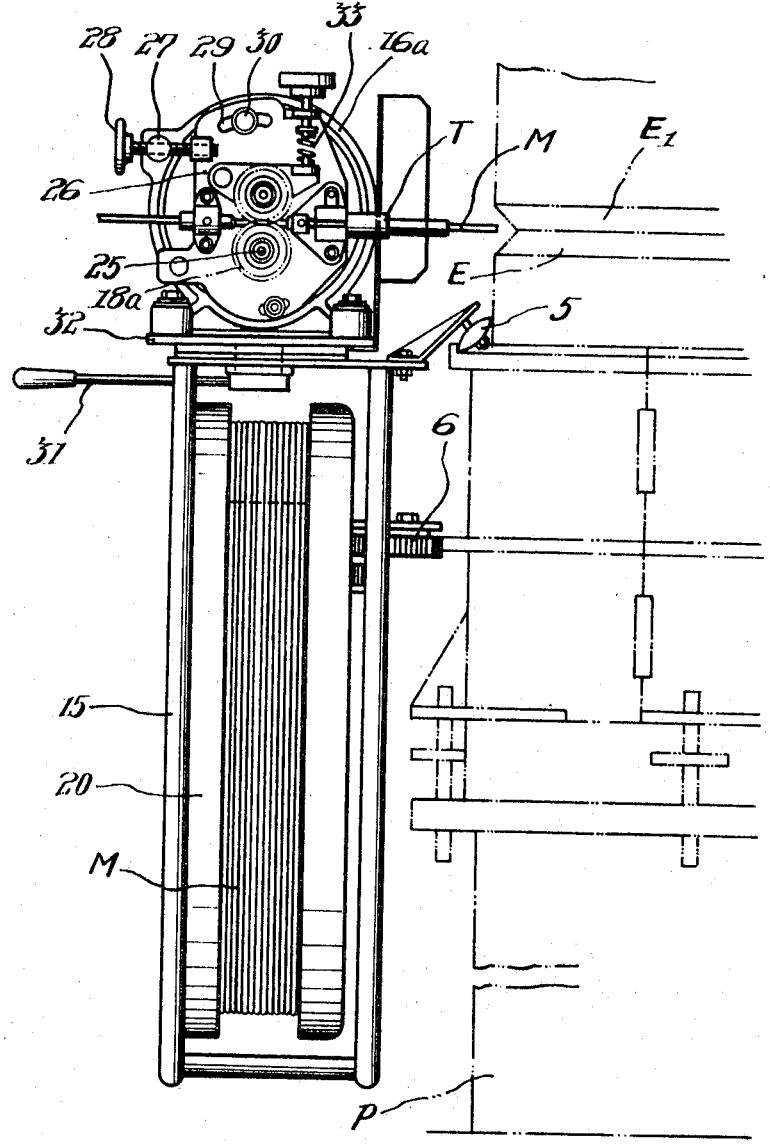

3,515,843
AUTOMATIC WELDING DEVICE FOR JOINTING CONCRETE PILE SECTIONS WITH STEEL END PLATES
Hisashi Arivasu, Chisato Okada, Yasushi Ishihara, Kenzo Momota, Mutsuo Yoshikawa, and Koji Nunokawa, Tokyo, Japan, assignors to Nippon Concrete Kogyo Kabushiki Kaisha, Tokyo, Japan
Filed Oct. 9, 1968, Ser. No. 766,125
Claims priority, application Japan, Feb. 16, 1968, 43/9,403
Int. Cl. B23k *9/12*
U.S. Cl. 219—125                                                 7 Claims

ABSTRACT OF THE DISCLOSURE

A full-automatic welding device for jointing concrete pile sections with steel end plates in the forming of piles at a work site. It comprises a hinged annular frame fittable to the pile being formed and a welder unit mounted on the frame and adapted to travel along its periphery while welding together the adjacent end plates of concrete pile sections. The device is featured by its different functional parts and their arrangements.

---

This invention relates to automatic welding devices and more particularly to those designed to joint endwise a plurality of concrete pile sections each having at either end a structure including a steel end plate and a tubular steel band connected therewith.

In usual practice, foundation piles, each including a plurality of such concrete pile sections, are formed by the procedure including the steps of placing a concrete pile section on the one previously struck into the ground with their adjacent end plates in aligned contacting relation to each other, connecting the end plates by electric-arc welding along the annular groove formed between the peripheral portions of the aligned end plates in the plane of their contacting end surfaces, and then striking the pile sections thus connected into the ground. Obviously, this procedure is repeated as desired to obtain a total pile length appropriate to the ground and the entire process including the welding operation is principally performed at the site of pile foundation.

The present invention has for its object to enable such welding operation to be performed in a fully automatized fashion.

Another object of the present invention is to enhance the efficiency of the process of successively jointing standardized concrete pile sections.

A further object of the present invention is to provide an automatic welding machine operable to form a welded joint of improved quality between the adjacent ends of two successive concrete pile sections at all times with a definite uniformity.

These and other objects, features and advantages of the present invention will become more apparent from the following description when taken in conjunction with the accompanying drawings, which illustrate some preferred embodiments of the present invention and in which:

FIG. 1 is a side elevation of the machine as set between two concrete pile sections to form a welded joint therebetween;

FIG. 2 is an enlarged vertical cross-sectional view showing the manner in which the welding machine is mounted on the lower concrete pile section by means of the mounting frame of the machine;

FIG. 3 is an enlarged side elevation of the welder unit of the machine;

FIG. 4 is a rear elevation of same;

FIG. 5 is a plan view of same, and

FIG. 6 is a side elevation, partly in section, of the welder unit;

FIG. 7 is a side elevation showing a modification of the mounting frame;

FIG. 7a is a cross-sectional view substantially taken along the line 7a—7a in FIG. 7;

FIG. 8 is a side elevation illustrating the manner in which the welder unit of the invention is used for jointing concrete pile sections in inclined position;

FIG. 9 is a side elevation partly in section, of a modified form of the welding-wire feed mechanism; and FIG. 10 is a side elevation showing a modification of the adjustable welding-torch support mechanism.

Figure 1:
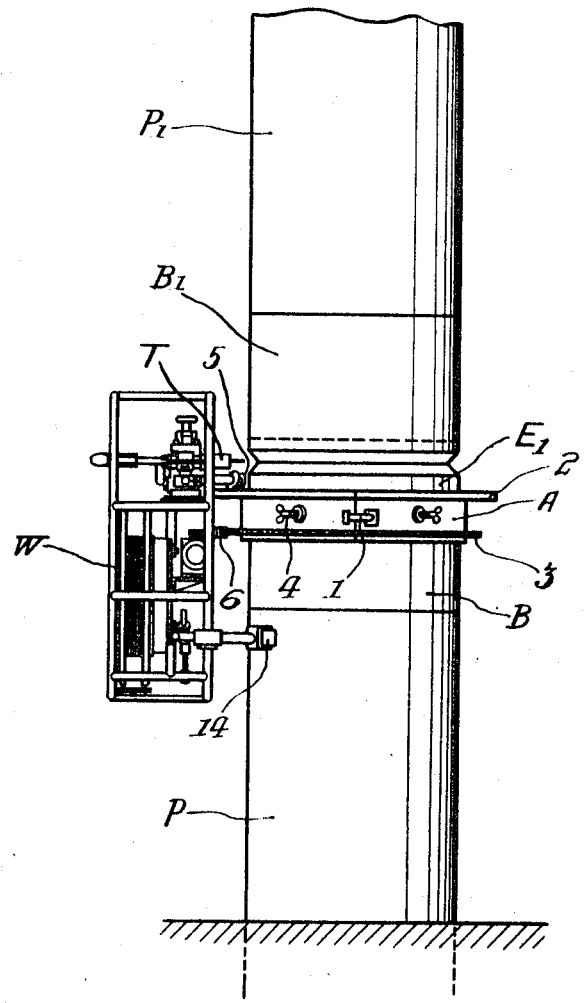
FIGS. 1 to 6 illustrate one form of automatic welding machine embodying the principles of the invention.

Description will next be made of the features of the full-automatic welding device, designed according to the present invention, and particularly of the structure of the different functional parts of the device.

MOUNTING FRAME

The welding device has a mounting frame A designed to support the device on the concrete pile section previously struck into the ground. The mounting frame A is made in two halves hinged together at 7 and thus can readily be fitted onto the top end portion of the concrete pile section P to which another concrete pile section $P_1$ is to be jointed. At their free ends, the half frames are connectible with each other as by hook means 1 to form an annular ring, embracing the pile section P on which the frame is fitted.

The mounting frame A is provided with an annular guide rail 2 for guidingly supporting guide rolls 5 carried on the welder unit, which is to be described hereinafter in detail, and a ring gear 3 in mesh with a drive pinion 6 also carried on the welder unit for its travel along the annular frame A. It will be apparent to those skilled in the art that both guide rail and ring gear are made in two halves carried on the respective half frames and complete their respective annular forms when the frame is closed on the pile section.

The mounting frame A is also provided with means for enabling the frame to be supported on the pile section in a correct position such that at all its circumferential points the frame is radially equally spaced from the periphery of the pile section and lies at the same height or in a plane at right angles to the pile axis. By this means, once the tip of the welding torch is properly set opposite the peripheral edge of the adjoining contacting surfaces of the pile end plates E and $E_1$, it remains in a correct position relative to the annular peripheral groove defined between the end plates E during the travel of the welder unit along the periphery of the mounting frame. Such means for supporting the mounting frame A in the correct position described above includes a number of adjusting bolts 4 carried by the frame and extending radially thereof. As will readily be understood, the frame can be readily centered relative to the pile section P by the adjustment of the bolts 4 to provide a uniform radial space between the frame and the periphery of the pile section P. The height of the frame or its position axial to the pile section is determined by placing the ends of the adjusting bolts 4 in engagement with appropriate positioning marks carried on the tubular reinforcing band B welded to the end plate E, for example, recesses $b$ previously formed in the band.

TRAVEL MECHANISM OF THE WELDER UNIT

The welding unit includes a travel mechanism which comprises a drive motor 16, a drive pinion 6 adapted to be driven from the motor through an appropriate speed reducing mechanism, a guide roll or rolls 5 held in rolling engagement with the guide rail 2 of the mounting frame A and cooperable therewith to guidingly support the welding unit thereon, and a pair of rubberized abutting rolls 14 engageable with the peripheral surface of the concrete pile section to hold the welder unit in an upright position under gravitation, which tends to tilt the welder unit as suspended on the guide rail 2 by roll means 5 toward the pile section. The guide roll means may include a single roll but it is preferable to provide a pair of guide rolls 5 as shown thereby to impart a greater stability to the welder unit while avoiding any undesirable concentration of the gravity load in the area of rolling engagement. The same holds with the abutting roll means 14. In order to accommodate varying diameters of concrete pile sections used (in practice, sized, for example, 450 mm. or 400 mm. in diameter), the guide rolls 5 are made adjustable in their mounting angle and in position on their own respective axes and the abutting rolls made adjustable in position on their own respective axes.

Further, for convenience when the concrete pile is struck in an inclined position, the travel mechanism may include two pairs of abutting rolls arranged at the top and bottom of the unit, for example, as shown in FIG. 8 at 14 and 14a.

WIRE FEED MECHANISM OF THE WELDER UNIT

Figure 3:
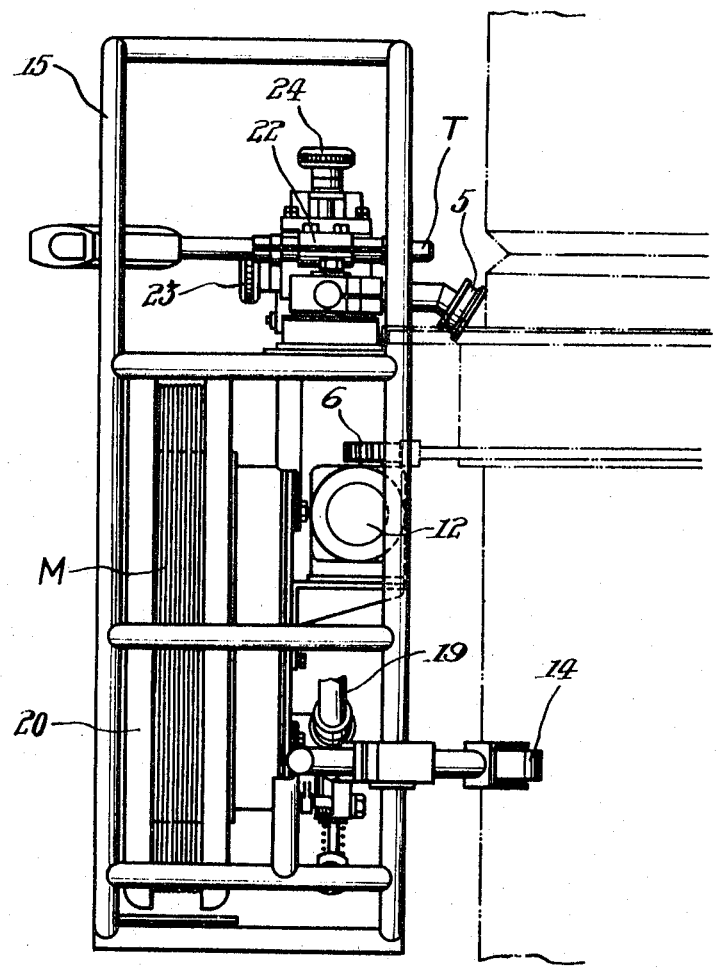
Figure 4:
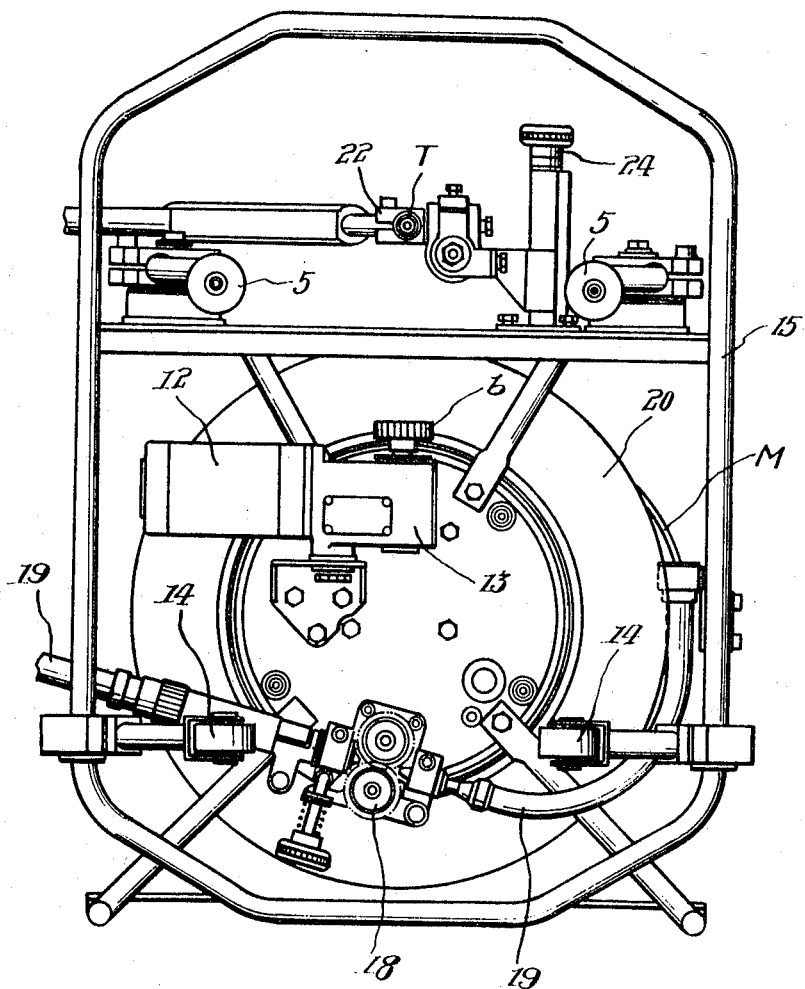
Figure 5:
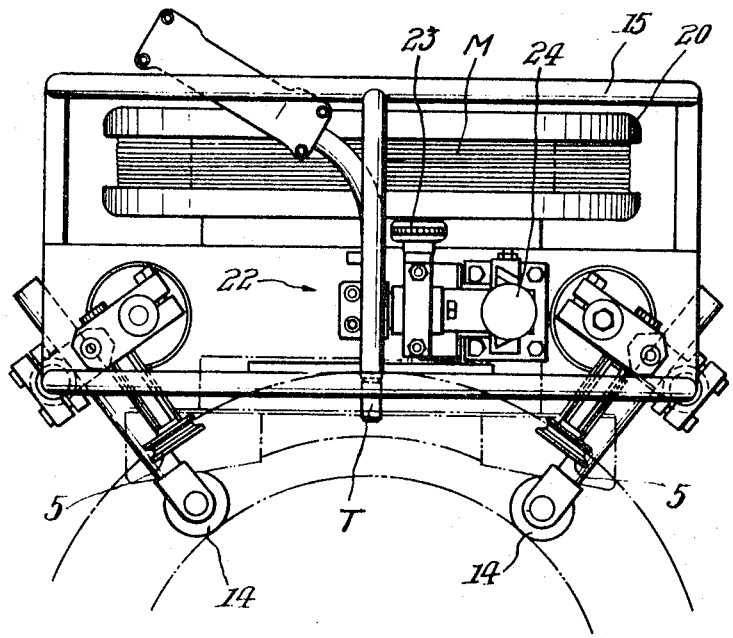
Figure 6:
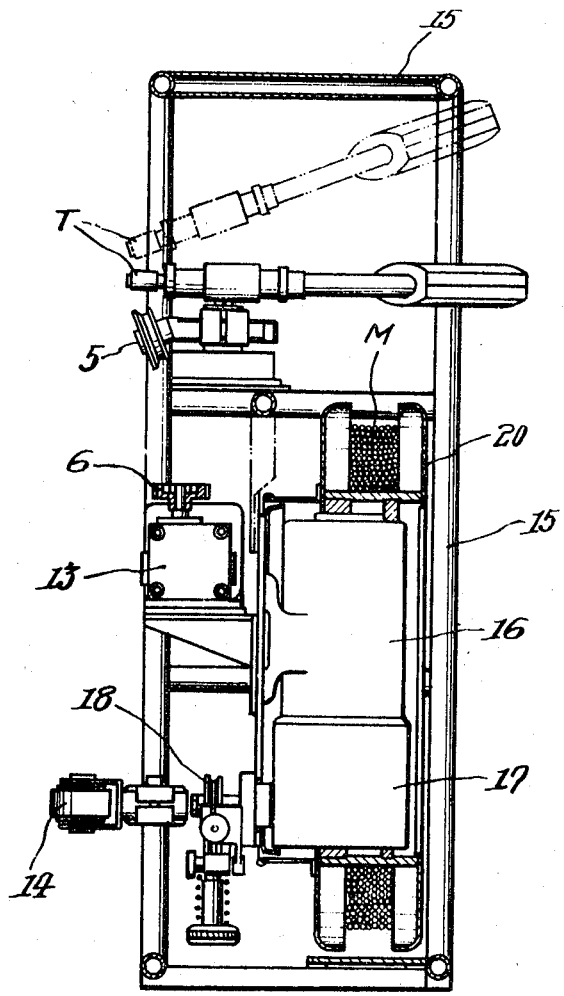

Provided on the welder unit W is a wire feed mechanism including a drive motor 16 for operating the mechanism, a speed reducer 17, a feeder 18, wire guide cable 19, and a wire reel 20. The feeder is comprised of a pair of opposing feed gears 18, which are driven through the speed reducer 17 from the drive motor 16, which takes, for example, the form of a D.C. servomotor. In operation of the feed mechanism, the welding wire M from the wire reel 20 is drawn through the interior of the follow wire guide cable 19 and, passing between the opposing feed gears 18, is forced out through the welding torch T. As shown in FIGS. 3, 5 and 10, the wire reel 20 is incorporated in a compact form within the welder unit W, but it may conveniently be arranged on the ground, as shown in FIG. 9.

WELDING-TORCH SUPPORT MECHANISM

The welding torch T of the welder unit must be mounted thereon in such a manner that it can be adjusted in its mounting angle as well as in its vertical position thereby to enable it to correctly position the tip of the welding wire M relative to the annular groove as formed between the adjoining end plates of the concrete pile sections being jointed. To this end, the welding torch is supported by a structure including a handle 23 for angular adjustment and another handle 24 for vertical adjustment, as shown in FIGS. 3 and 5. Through the welding torch T with such supporting structure may be formed integrally with the welding wire feed mechanism described above, it is rather desirable for convenience in practice and particularly for the adjustable support of the welding torch T to form the torch support and wire feed mechanisms separate from each other, making only the welding torch adjustable in both angular and vertical positions.

Figure 2:
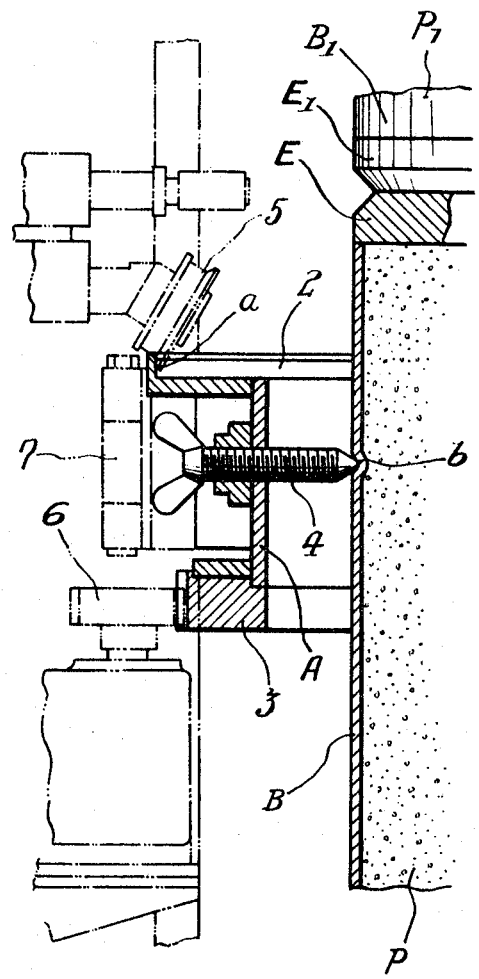

Referring to FIGS. 1, 2 and 3, reference characters P and $P_1$ indicate two respective concrete pile sections being jointed; B and $B_1$ indicate reinforcing bands on the adjacent end portions of the respective pile sections; and E and $E_1$ indicate end plates fixed to the adjoining end faces of the respective pile sections; integrally with the respective reinforcing bands thereon.

Reference character A indicates an annular mounting frame A for setting the welding device of the present invention on the top end portion of the lower pile section P. The mounting frame A is made in divided form to enable it to be readily mounted on the pile section to embrace the reinforcing band B thereon and includes two half-frame members hinged together as at 7 with hook means 1 provided for clamping together the free ends of the half-frame members in aligned abutting relation. An annular guide rail 2 is welded to the top end of the mounting frame A (see FIG. 2) and a ring gear 3 is formed on the outer periphery of the lower portion of the frame. A plurality of adjusting bolts 4 are threaded radially inwardly through the mounting frame intermediate its top and bottom ends at points equally spaced along the circumference of the frame. The guide rail 2 is formed along its entire outer periphery with an annular flange $a$ for guiding engagement with guide rolls 5 of the welder unit W, which protrude therefrom and by means of which the unit is supported on the rail. The said gear 3 is arranged in mesh with a drive pinion 6 carried on the welder unit W for driving the latter in travel along the mounting frame.

Formed in the reinforcing band B of the concrete pile section P are recesses $b$ for receiving the ends of the respective adjusting bolts 4 described hereinbefore (see FIG. 2).

By adjusting the bolts 4 into proper pressure engagement with the respective recesses $b$, the mounting frame A can be readily secured in place on the reinforcing band B of the pile section P in precisely centered relation thereto and in a correct axial position thereby to enable the adjoining end plates E and $E_1$ of pile sections P and $P_1$ to be welded together uniformly along the annular groove defined between the end plates.

FIGS. 7 and 7a illustrate a modified form of mounting frame A, which includes a plurality of arcuate leaf springs 8 arranged on the inner wall of the frame A. With this arrangement, the mounting frame when fitted to the concrete pile section P will be automatically centered relative thereto under the resilience of the leaf springs 8 acting in balance with each other. Pivotally secured to the outer wall of the mounting frame A are a number of positioning fingers 9 which are releasably engageable with the annular groove between the end plates E and $E_1$ of the two concrete pile sections P and $P_1$ being jointed thereby to facilitate the positioning of the frame on the pile section P particularly in connection with the axial distance between the weld groove and the guide ring 2 of the frame.

Reference will next be made to FIGS. 3 to 6, which illustrate a preferred form of welder unit W. As shown, this unit is provided with a travel mechanism including a drive motor 12, a speed reducer 13, a drive pinion 6 drivable from motor 12 through speed reducer 13, a pair of guide rollers 5 adapted to be held in rolling engagement with the peripheral flange $a$ of the guide rail 2 of the frame described hereinbefore, and a pair of rubberized abutting rolls 14 supported on the lower portion of the welder unit W. Such mechanism is mounted on a guide frame 15 of appropriate configuration made of pipe material. To accommodate different outer diameters of concrete pile sections, the guide rolls 5 are adjustable in their mounting angle relative to the axis of the pile section P and also in their radial distance therefrom and the abutting rolls 14 are adjustable in their radial distance from the pile axis.

FIG. 8 illustrates a modification of the travel mechanism for use when concrete pile sections are struck into the ground in an inclined state. This modification includes, in addition to the abutting rolls 14, a further pair of abutting rolls 14a arranged on the top portion of the welder unit W for the purpose of enabling the travel mechanism to be positively guided even when it assumes a position as indicated by the chain lines at W' in the figure.

Referring again to FIGS. 3 to 6, the welder unit W shown includes a welding-wire feed mechanism which comprises a feed motor 16, a speed reducer 17, a feeder 18, a wire guide cable 19, and a wire reel 20. Motor 16, taking the form of a D.C. severvomotor, is built in the wire reel 20 integrally with speed reducer 17. Feeder 18, including a pair of opposing feed gears, operates under the drive of the combined motor-reducer and the welding wire M from the wire reel 20 is drawn through wire guide cable 19 and, passing between the opposing feed gears, forced out through the welding torch T.

FIG. 9 illustrates a modification of the welding-wire feed mechanism which includes, in place of said wire reel 20, a wire bobbin case 21 located on the ground or other fixed surface and connected with a tubular form of guide cable 19.

The welding unit shown in FIGS. 3 to 6 includes a welding torch T which is adjustable in mounting angle and in vertical position properly to position the tip of the welding wire M relative to the weld groove between the two concrete pile sections P and $P_1$. Specifically, the welding torch is provided on its support 22 with a handle 23 for angular adjustment and a handle 24 for vertical adjustment and, by adjusting these handles, the tip of the torch T can be adjusted to assume any desired position and direction.

FIG. 10 illustrates a modified form of adjustable welding-torch support mechanism. In this embodiment the welding torch T is formed integral with a welding-wire feed mechanism which includes a feed motor 16a operable to drive a pair of feed rolls 18a and a torch support plate 26 is rotatably mounted on the shaft 25 of one of feed rolls 18a. Threadably engaged with the torch support plate 26 is an adjusting bolt 28 which is threaded through a projection 27 formed on the casing of motor 16a. Also formed on the motor casing is a stationary pin 30 which extends through an arcuate groove 29 formed in the support plate 26 to limit the pivotal movement thereof. With this arrangement, when adjusting bolt 28 is turned in either direction, the torch support plate 26 is rotated about the roll shaft 25 together with the welding torch T. In this manner, the welding torch can be finely adjusted relative to the weld groove between the pile end plates E and $E_1$ and such adjustment can be made with ease even during the welding operation when desired. Reference numeral 31 indicates an operating handle provided for turning the base frame 32 of feed motor 16a right and left relative to the structure of welding unit W. Reference numeral 33 indicates an adjusting handle for pressing down the upper gear of the feeder 18a by way of a compression spring for fine adjustment of the delivery pressure of the pair of feed rolls 18a acting on the welding wire M.

While the invention has been shown in several forms, it is obvious to those skilled in the art that it is not so limited, but is susceptible of various changes and modifications without departing from the spirit and scope of the claimed invention.

What is claimed is:

1. A full-automatic welding device for jointing axially aligned and end abutting cylindrical concrete pile sections each with end structures including a metal end plate and a reinforcing metal band integral therewith, said device comprising a mounting structure fixable to the periphery of the lower concrete pile section in embracing relation thereto and a welder unit positioned to travel about the mounting structure while being suspended thereon; said mounting structure including an annular ring-like frame divided in two half frames, and with said annular frame having a larger center opening than the diameter of said pile sections, a guide rail and a ring gear both formed along the entire periphery of the frame, and a number of adjusting bolts carried by said frame and extending radially inwardly therefrom for engagement with the peripheral surface of the end structure of the pile section and particularly of the reinforcing band thereon to center said annular frame thereon;

said welding unit including: a travel mechanism comprising a drive motor, a drive gear operatively driven from said drive motor by a suitable speed reduction means and meshing with said ring gear on said mounting structure, guide roll means held in engagement with said guide rail on said frame to roll along said guide rail under the guidance thereof, and rolls position for rolling engagement with the periphery of the pile section below said end plate; a welding wire feed mechanism comprising a feed motor, a wire feeder driven by said feed motor by a suitable speed reduction means, a wire guide cable, and a wire reel; and a welding torch mechanism.

2. A full-automatic welding device as in claim 1 where said adjusting bolts are replaced by a plurality of leaf springs carried by said half frames on the radially inner surface thereof and extending perpendicular to a plane defined by said annular frame for resilient centering engagement with a said pile end section, said leaf springs being positioned in circumferentially uniformly spaced relation.

3. A full-automatic welding device for jointing cylindrical concrete pile sections as in claim 2 and where a plurality of positioning finger means are pivotally secured to said mounting structure on the outer surface thereof and are releasably engageable with an annular weld groove defined between the adjoining pile sections to position said mounting structure a predetermined distance from said weld groove.

4. A full-automatic welding device for jointing cylindrical concrete pile sections as in claim 1 and where an upper and a lower pile section are abutted at their ends, and where said guide rail is formed from a metal plate having a flat upper surface and said guide roll means engage the said upper surface, said metal band having suitable marking at circumferentially spaced portions thereof, which marking is uniformly spaced from the upper end of said lower pile sections, said adjusting bolts being circumferentially spaced to engage said marking, and at least three of said adjusting bolts are provided.

5. A full-automatic welding device as in claim 1 where said welding torch mechanism comprises a welding torch and an adjustable torch supporting structure including handle means for angular and vertical adjustments of the welding torch relative to the annular weld groove defined between the adjoining pile sections; said guide roll means being above and vertically spaced from said rolls.

6. A full-automatic welding device as in claim 1 where said adjusting bolts comprise members adjustably secured to said annular frame for controllable movement radially inwardly thereof.

7. A full-automatic welding device as in claim 1 where said guide rail includes an annular upwardly extending edge flange, and said guide roll means are positioned radially inwardly of said edge flange and are angled downwardly and outwardly to engage said edge flange, a plurality of rolls forming said guide roll means to secure said welding unit operably to said mounting structure.

References Cited

UNITED STATES PATENTS

| | | | |
|---|---|---|---|
| 1,860,172 | 5/1932 | Chapman | 219—125 |
| 2,985,746 | 5/1961 | Harmes | 219—125 |
| 3,042,787 | 7/1962 | Kotecki | 219—60.1 |
| 3,126,471 | 3/1964 | Nelson | 219—125 X |
| 3,194,937 | 7/1965 | Brons et al. | 219—60.1 |
| 3,299,245 | 1/1967 | Tinner | 219—60.1 |

JOSEPH V. TRUHE, Primary Examiner

L. A. SCHUTZMAN, Assistant Examiner

U.S. Cl. X.R.

219—60